June 24, 1947.    J. H. BIGELOW ET AL    2,422,714
MINIATURE ELECTRIC METER
Filed May 9, 1944    4 Sheets-Sheet 1
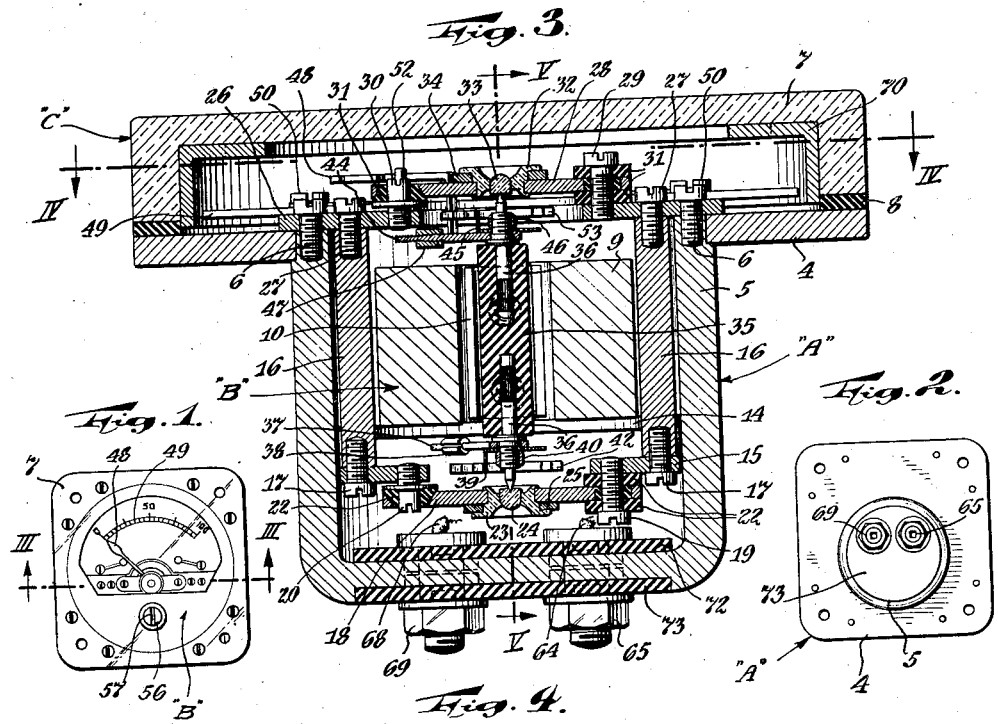
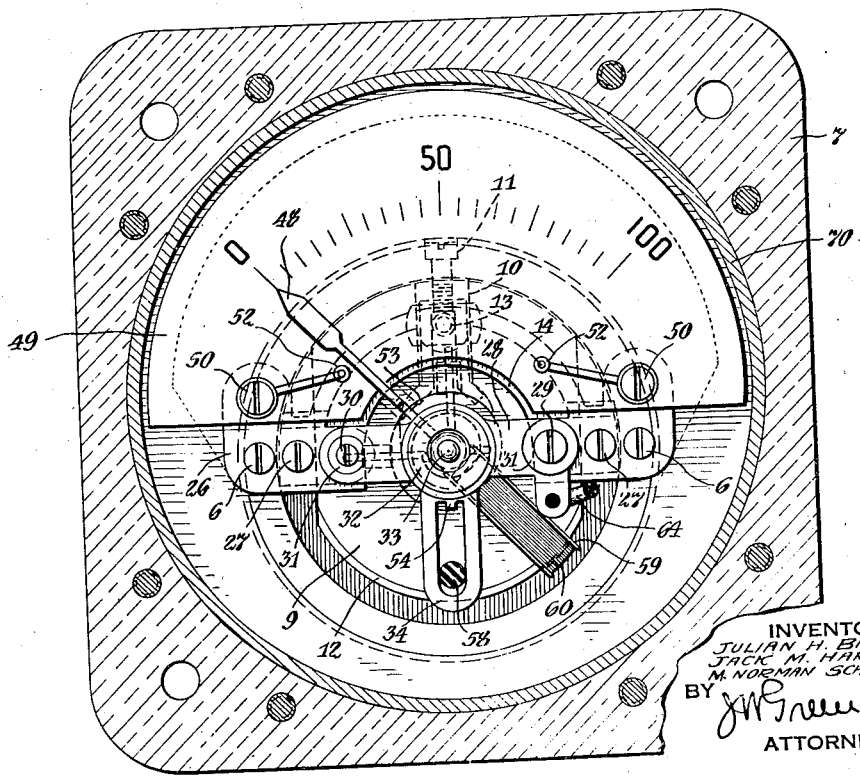
INVENTORS
JULIAN H. BIGELOW
JACK M. HARRIS
M. NORMAN SCHWEIZER
BY
ATTORNEY

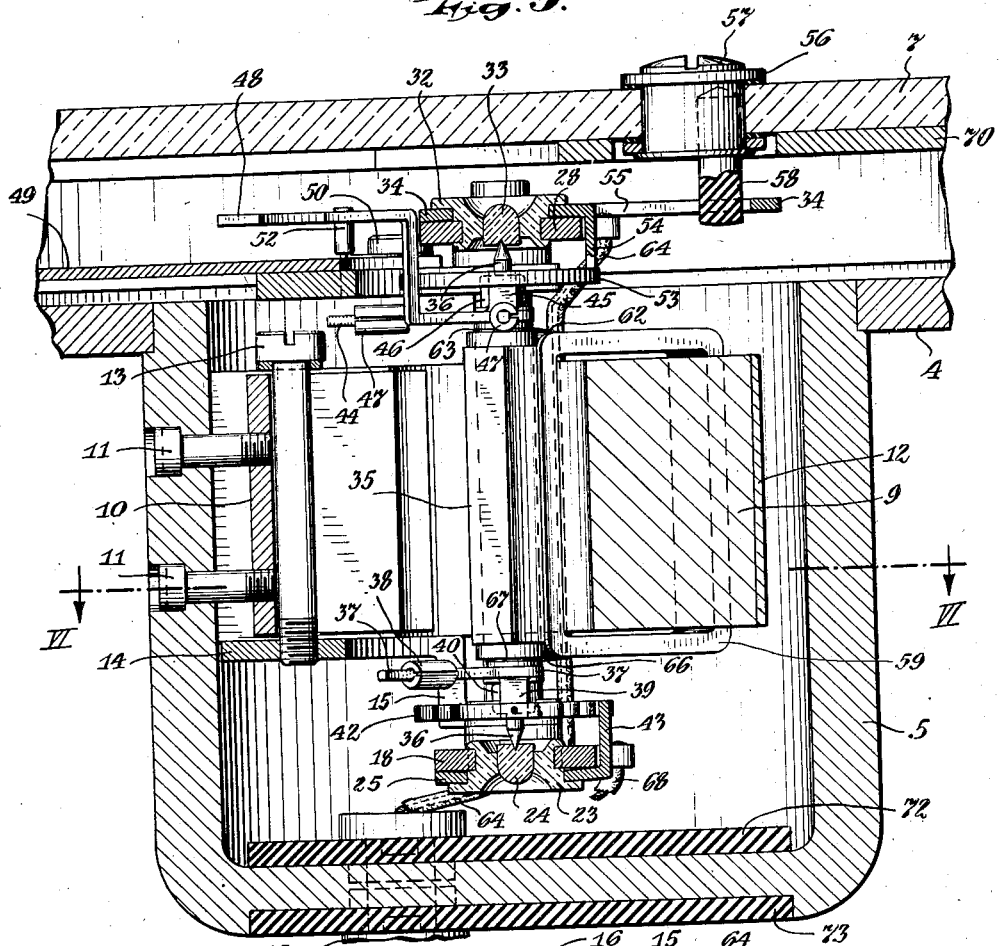
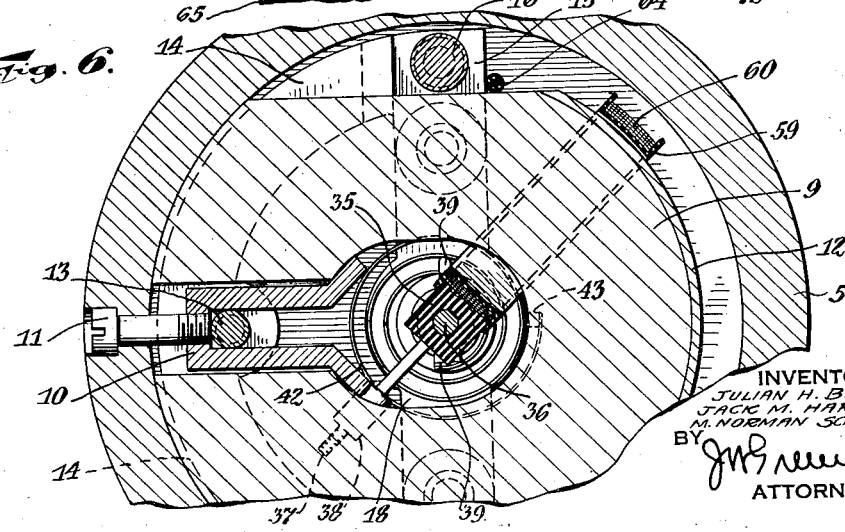

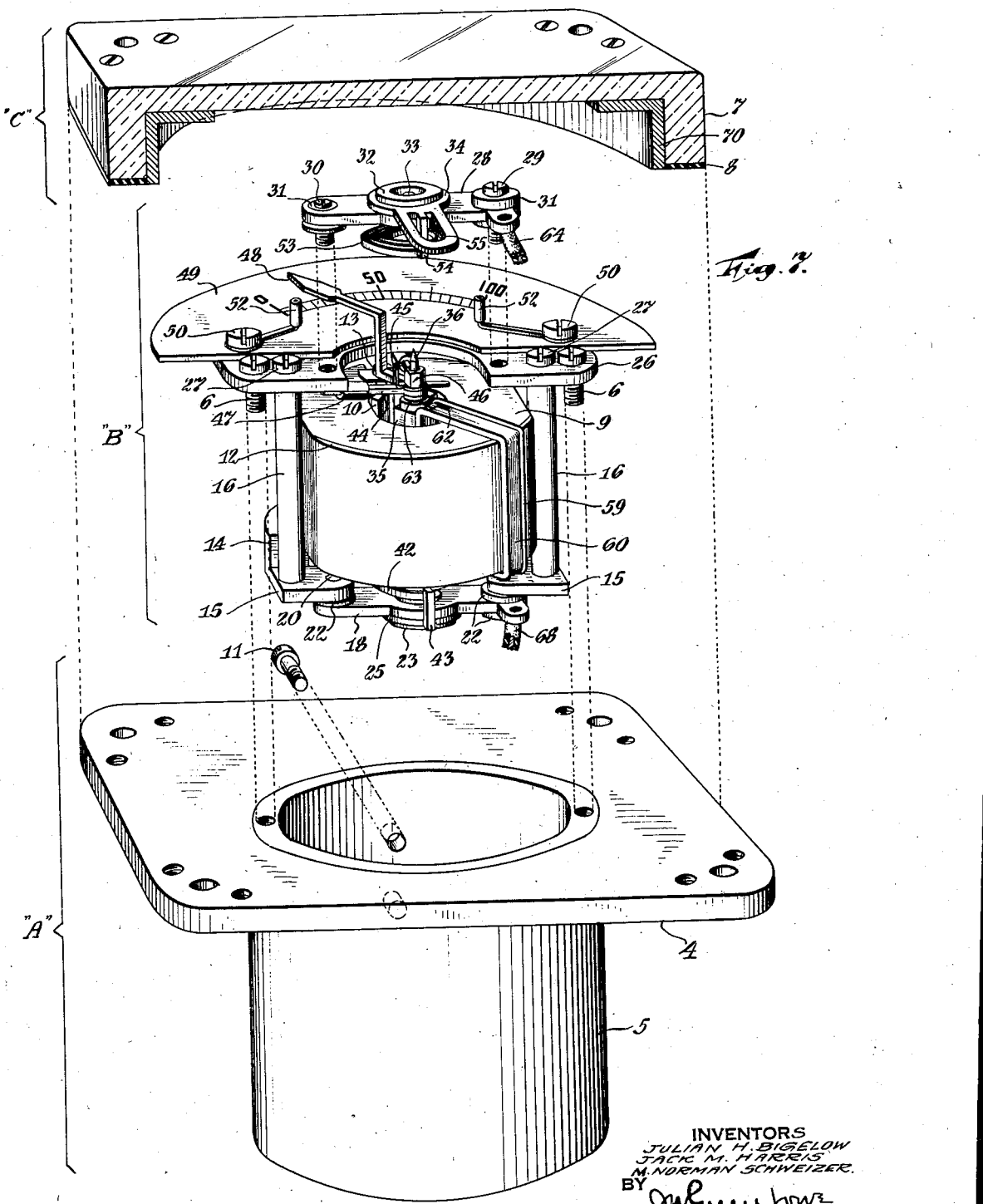

June 24, 1947.  J. H. BIGELOW ET AL  2,422,714
MINIATURE ELECTRIC METER
Filed May 9, 1944   4 Sheets-Sheet 4
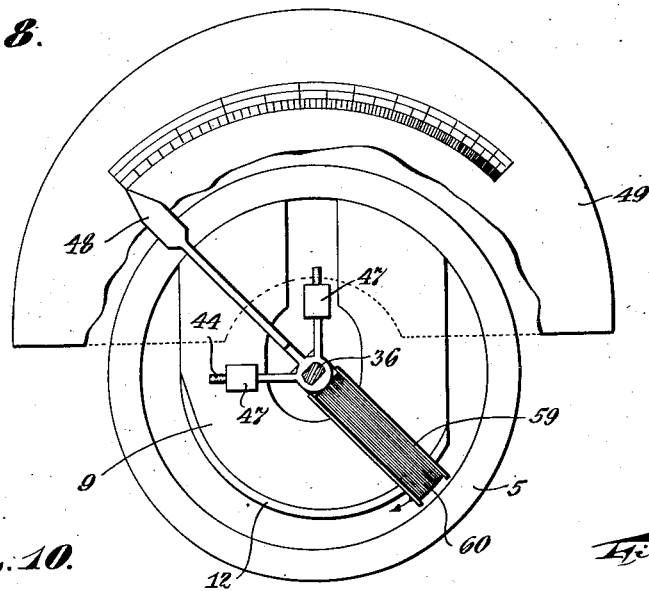
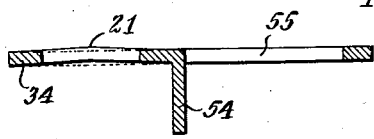
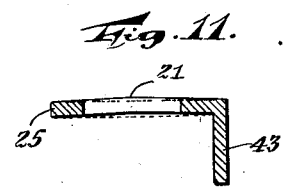
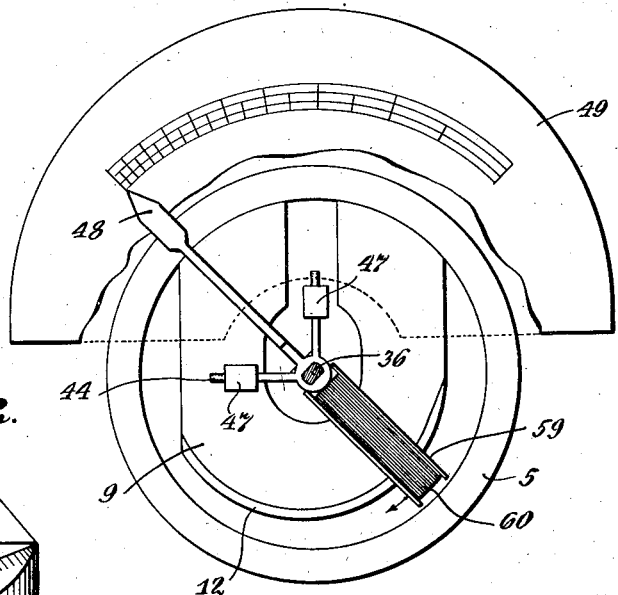
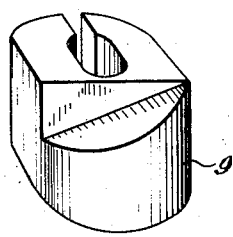
INVENTORS
JULIAN H. BIGELOW
JACK M. HARRIS
M. NORMAN SCHWEIZER
BY
ATTORNEY Patented June 24, 1947

2,422,714

UNITED STATES PATENT OFFICE 2,422,714

MINIATURE ELECTRIC METER

Julian H. Bigelow, New York, Jack M. Harris, Long Island City, and M. Norman Schweizer, Bayside, Long Island, N. Y., assignors to Bulova Watch Company, New York, N. Y., a corporation of New York Application May 9, 1944, Serial No. 534,720

8 Claims. (Cl. 171—95)

1

The present invention relates to electrical measuring instruments and particularly to such instruments of the D'Arsonval type used for measuring electrical current, voltage or wattage, and frequently referred to generally as galvanometers.

At the present time many such instruments are being employed on aircraft for the measurement of electrical quantities supplied to the continually increasing number of electrical accessories so essential to civilian and military aviation. Total weight has always been a paramount consideration in the aircraft industry and since the necessity for additional accessories with their various meters involves the same problem, the demand for reduction in size and weight has been passed on to instrument manufacturers.

Efforts have been made to solve this problem, but the difficulty has been, not alone a decrease in size and weight, but its achievement without sacrifice of some of the other essential requirements, such as accuracy and sensitivity, adequate magnetic shielding from magnetic disturbances caused by other instrumentalities, and accessibility of the meter for replacement and repair of various parts after initial installation.

It is accordingly an object of the present invention to provide an electrical meter which is of exceptional small size and compactness without a scarifice of accuracy and sensitivity.

Another object of the present invention is the provision of an electrical meter of small size and weight and wherein the meter is adequately shielded to prevent its being effected by and producing any extrinsic magnetic disturbances.

Another object of the present invention is the provision of an electrical meter having compactness without sacrificing accuracy and sensitivity and wherein the meter may be readily disassembled for replacement and repair after installation at no impairment to its precision of operation.

Still further objects of the present invention will become obvious to those skilled in the art by reference to the accompanying drawings wherein, Figure 1 is a front view of a meter constructed in accordance with the present invention;

Figure 2 is a bottom view of the meter as shown in Fig. 1;

Figure 3 is a sectional view on an enlarged scale taken on the line III—III of Fig. 1 and looking in the direction indicated by the arrows;

Figure 4 is a sectional view taken on the line IV—IV of Fig. 3 and looking in the direction of the arrows;

Figure 5 is a sectional view on a still larger

2 scale and taken on the line V—V of Fig. 3 and looking in the direction of the arrows;

Figure 6 is a sectional view taken on the line VI—VI of Fig. 5 and looking in the direction of the arrows;

Figure 7 is an exploded perspective view of the meter of the present invention as shown in Fig. 1 illustrating the facility with which the entire meter can be readily disassembled for replacement and repair of the various parts;

Figure 8 is a view somewhat similar to that of Fig. 4 but with parts removed and broken away to better illustrate a slight modification which the meter of the present invention may take;

Figure 9 is a view identical to that of Fig. 8 but showing a still further modification which the meter of the present invention may take;

Figure 10 is a sectional view of the top regulator which forms one of the elements of the meter of the present invention;

Figure 11 is a sectional view similar to that of Fig. 10 but showing the bottom regulator which forms a part of the meter of the present invention; and Figure 12 is a perspective view of a still further modification which the embodiments as shown in Figs. 8 and 9 may take.

As shown in the drawings, a practical embodiment of the invention includes a housing A, a meter assembly B and a cover assembly C (see Fig. 7).

The completed or assembled meter is shown in Figs. 1 and 2, and as will be noted, the housing A is provided with a tubular casing 5 closed at one end and of metal such as steel having, in accordance with the present embodiment of the invention, an inside diameter of 1 inch, and a face-plate 4 of similar metal. The face-plate may be of from 1½ to 2 inches square and provided with a circular aperture fitting on to a shoulder around the periphery of the open end of the tubular casing 5. The casing 5 and the face-plate 4 serve as the housing A to contain the meter assembly B which may be inserted or removed from the housing as a unit, for inspection or adjustment as will be hereinafter more fully described.

When the meter assembly B has been inserted into the housing A, it is secured by a pair of tapbolts 6, after which the cover C is fastened to the face-plate 4. The cover C may consist of a metal frame having a window or may, as shown, be formed of a transparent material such as a plastic or the like to provide a cover-window 7. The cover-window seats on the face-plate 4 and a gasket 8 is provided to seal the meter assembly from the atmosphere, the cover-window 7 being held in place by means to be described.

The magnet 9, as shown particularly in Figs. 6 and 12, is constructed as a solid body having one portion provided with an arcuate contact-surface of the same radius of curvature as that of the internal surface of the casing 5, and an opposite arcuate surface of said body having a smaller radius of curvature so as to provide a surface spaced equi-distant or concentric with respect to the inner surface of a portion of the casing 5, thus forming an active air-gap therebetween, as hereinafter more fully described. The magnet 9 is provided with a slot or cavity to receive a bifurcated tension-clamp 10 having oppositely disposed angular ends frictionally engaging the surfaces of the slot.

For the purpose of holding the arcuate contact surface of the magnet 9 in direct intimate contact with the corresponding inner surface of the casing 5 a pair of tie-bolts 11 pass through the casing and threadedly engage the clamp 10. By means of these tie-bolts 11 and because of the contact surfaces of similar curvature, the entire contact surface of the magnet 9 is bonded to the casing 5, so that the latter forms a return ring for the magnet.

Although this magnet 9 may be formed of any suitable magnetic material, it has been found desirable, when using a metal, such as an alloy known in the art as "Alnico," to affix thereto a layer of a different metal as for example soft steel 12, by soldering or the like, to the arcuate surface forming the pole of the magnet piece. The addition of the layer 12 tends to smooth out local flux concentrations which might otherwise result from large crystal formation attendant upon the fabrication of magnetic metallic alloys such as "Alnico." By reference particularly to Figs. 5 and 6 it will be noted that a clamp-screw 13 passes through the bifurcated tension clamp 10, the lower end of said screw threadedly engaging a lower arcuate bracket 14 having depending angular ends 15 to which a pair of posts 16 are secured as by means of screws 17 (see Fig. 3).

A lower-bridge 18 is secured to the ends 15 of the bracket 14 by suitable means, such as a cap-screw 19 at one end, and a bridge adjusting screw 20 at its other end, with such bridge being effectively insulated from the bracket 14 by insulating washers 22. Staked into this bridge 18 is a jewel-cap 23 provided with a jewel bearing 24 pressed therein and a regulator 25 is interposed between the bridge 18 and the jewel cap 23 prior to staking in the latter. As shown in Fig. 11, this regulator 25 is slightly crimped at 21 for the purpose of producing a spring action which assures adequate friction between the regulator 25 and the bridge 18.

Above the magnet 9 (see Fig. 3) is an upper arcuate bracket 26, through which pass the screws 6 for holding the meter-assembly B within the casing 5 of the housing A, and also similar screws 27 pass therethrough for securing the upper end of the posts 16 to said upper-bracket 26. An upper-bridge 28, similar to the lower-bridge 18, is secured to the upper bracket 26 by means of a cap screw 29 and an adjusting screw 30. The bridge 28 is electrically insulated from the bracket 26 by insulators 31 in the same manner as previously described relative to the lower bracket 14.

The upper bracket 26 likewise carries a jewel cap 32 provided with a jewel bearing 33 pressed therein and having a regulator 34 interposed between the jewel cap 32 and bridge 28. Also by reference to Fig. 10, it will be noted that the upper regulator 34 is crimped at 21 to provide a spring action and adequate friction between the regulator 34 and the upper bridge 28, in the identical manner as that between the lower bridge 18 and lower regulator 25, as previously described. Coaxially disposed relative to the magnet 9 is a four-sided standard or pillar 35 of suitable electrical insulating material, such as "Bakelite" or the like, and into each end of which a pivot-pin 36 is driven and cemented or otherwise secured. The standard 35 is journaled by means of the pivot-pins in bearings such as the jewels 24 and 33, thereby providing a balanced rotatable support to which a coil is attached as hereinafter described. As shown more clearly in Figs. 3 and 5, each pivot-pin 36 is provided with a portion of reduced diameter tapering into a point which bears on the respective jewels 24 and 33 so as to enable substantially non-frictional rotation of the standard 35. The lower pivot-pin 36 supports a balance arm 37 onto which a split threaded nut 38 is secured by cutting its own threads, when rotated about the arm, to form a counterweight and an angularly disposed hair spring support or lug 39 is secured to the pivot-pin 36, both the balance arm 37 and lug 39 being held rigidly in place upon the pivot-pin 36 by a nut 40. A hair spring 42 surrounds the pivot-pin 36 with one end thereof secured to the lug 39, while its other end is secured to a similar support or lug 43, projecting upwardly and constituting an angular extension of the lower regulator 25, thus imparting a slight torque to the pillar 35 controlled by a partial rotation of the regulator 25.

In a similar manner, the upper pivot-pin 36 also supports a multiple branched balance arm 44 and a hair spring support or lug 45 held in place by a nut 46. The various branches of this arm 44 are provided with split threaded nuts 47 forced thereon by cutting their own threads when rotated about the arm and serve as counterweights in the same manner as previously mentioned with reference to the nut 38. It is to be noted, however, that in this instance one of the branches of the balance arm constitutes an angularly bent pointer 48 registering with a scale-plate 49, which is secured to the upper bracket 26 by means of screws 50, which also hold a pair of stops 52 in place to limit movement of the pointer 48. Again the upper pivot-pin 36 is surrounded by a hair spring 53, one end of which is secured to the lug 45, while its other end is secured to a support or lug 54 depending from the upper regulator 34 which, together with the lower hair spring 42, applies a counter-clockwise torque to the pivot-pins 36 and hence to the pillar 35, as shown in Figs. 4 and 6.

A partial rotation of the upper regulator 34 not only adjusts the tension of the upper hair spring 53 but also enables adjustment to zero setting of the pointer 48 on the scale 49. For the purpose of this latter adjustment when the meter is completely assembled with its cover-window 7 in place, the regulator 34 is provided with a slot 55. As shown in Fig. 5, the cover-window 7 is provided with a rotatable bushing 56 having a set screw 57 accessible from the outside face of the cover to permit rotation of the bushing by means of a suitable tool such as a screw-driver.

Projecting downwardly from the underside of the bushing 56 and eccentric relative to its axis of rotation is an insulated detent or pin 58 extending into the slot 55 of the regulator 34. Accordingly, upon turning the screw 57, the entire bushing 56 rotates in the cover-window 7, and since the detent 58 is eccentrically positioned, it engages the regulator 34 with attendant adjustment of the latter in the desired direction. A movement of the regulator 34 increases or decreases the torque of the hair spring 53, which in turn causes movement of the balance arm 44, one branch of which constitutes the pointer 48, until the pointer registers with the zero graduation on the scale 49.

From the drawing and as hereinbefore pointed out it will be noted that an active air-gap is provided by the annular space between the permanent magnet 9 with its layer 12 constituting one pole and the metallic casing 5 as the other pole or the return ring for the magnet. A substantially rectangular flanged coil-form 59 is provided with a winding 60. The standard 35 is cemented to one side of the coil 60 and is held in alignment by the flanges on the coil-form into which it is fitted, making it possible to attain precision alignment with the magnet 9 and casing 5. This coil and coil-form are disposed to move freely in the magnetic field between the magnet 9 and casing 5 and its mounting imparts strength and rigidity to the coil.

In order to supply electrical energy to the coil 60, one end thereof is connected, by a conductor 62 and a washer-like terminal 63, to the upper pivot-pin 36 and hence through the metal parts including the balance arm 44, hair spring 53 and regulator 34, to the insulated bridge 28, with a conductor 64 extending from this bridge to an insulated terminal 65 provided in the bottom of the casing 5. Likewise, the other end of coil 60 is connected by a conductor 66 and washer-like terminal 67, to the lower pivot pin 36 and through the balance arm 37, hair spring 42, and regulator 25, to the lower insulated bridge 18 from which a conductor 68 extends to a terminal 69 similar to the terminal 65.

For panel mounting of the meter of the present invention, it is often essential that the meter not only be entirely free of magnetic disturbances behind the panel, but also free from any appreciable magnetic fields of its own either behind or in front of the panel, which would otherwise result in disturbing adjacent equipment.

To avoid this difficulty the meter is designed in such a way as to neither produce an appreciable external magnetic field nor to be appreciably affected by a relatively strong external magnetic field. This results from the presence in the design of the continuous cup-shaped high permeability case 5, which in conjunction with an optional high permeability face plate 70—essentially completing the magnetic enclosure—provides excellent magnetic shielding. In addition the bottom of the casing 5 is provided with annular insulating discs 72 and 73 disposed inside and outside of the casing 5.

The meter thus far described is arranged to have a scale 49 of uniform graduation. There are, however, occasions when it is desirable to have scales of varying graduation either at the upper or lower end of the scale where variations in voltage or current may ordinarily cause very little movement of the meter pointer because of increased torque on the hair springs. In order to provide for such conditions, a modification of the meter is shown in Figs. 8 and 9.

By reference now to Fig. 8 it will be noted that the graduations on the scale 49 vary in spacing at the upper limit thereof. Also, the air-gap formed between the permanent magnet 9 and metallic casing 5 varies in width by increasing in the direction of movement of the coil frame 59 and coil 60 through a gradual change in the radius of curvature of the working surface of the magnet. The weakened magnetic field accordingly causes a lesser deflection of the pointer for the same current or voltage, since the magnetic flux across the air-gap varies accordingly.

Fig. 9 differs from that of Fig. 8 merely in a reversal in the variation of the air-gap between the magnet 9 and casing 5 wherein the latter decreases in the direction of movement of the coil 60 and the spacing between the scale graduations decreases at the lower or zero end thereof. The operation is identical to that of Fig. 8 except in reverse.

In Fig. 12 a modification differing somewhat from that of Figs. 8 and 9 is shown but which will accomplish the same results as the structure of these latter two figures. Instead of varying the arc of the surface of the magnet 9 adjacent the casing 5 to form an air-gap having a varying spacing, the magnet 9 is so formed as to provide a varying width of the working surface of the magnet thus varying the flux and producing the same effect as in Fig. 8. If, on the other hand, a scale such as shown in Fig. 9 is desired, the magnet 9 as shown in Fig. 12 may be oppositely formed to produce the reverse characteristics from those shown in Fig. 12 so that the magnet can be employed with a scale as in Fig. 9.

From the foregoing it will thus be seen that a meter of efficient magnetic design is herein provided having adequate magnetic shielding and wherein the movement is small and compact without sacrifice in sensitivity.

The advantages attained result from the compactness of the design which is accompanied by a minimum of stray leakage flux, and also by the use of the metal both as one face of the active air-gap and also as the return path for the magnetic flux.

Although the meter is exceptionally compact, it can be readily disassembled in the field by removal of but a few elements allowing withdrawal of the frame supporting the various assembled parts. Owing to the provision of the flanged coil-frame which snugly fits and is cemented to the rotatable pillar, the coil likewise can be readily replaced in the field for service and repair with the same precision as during its original installation at the factory.

Although several embodiments of the present invention have been shown and described, it is to be understood that still further modifications of the same may be made without departing from the spirit and scope of the appended claims.

We claim:

1. An electrical measuring instrument comprising a cylindrical metal casing, a magnetic body having an arcuate surface portion, means for holding said body with its arcuate surface portion in contact with the arcuate interior wall of said cylindrical casing, an opposite side of said body spaced from the wall of said casing to form an active air-gap between said body and said casing wall, said wall serving as a return ring for said magnetic body, and a coil movable in said active air-gap upon the passage of electrical energy through said coil.

2. An electrical measuring instrument comprising a tubular metal casing, a magnetic body having a slot, a spring-clamp engaging said slot to hold said body with one portion thereof in contact with the interior wall of said casing and with an opposite side of said body spaced from the wall of said casing to form an active air gap, a rotatable support in said slot, and a coil mounted on said support and movable in said active air-gap upon the passage of electrical energy through said coil.

3. An electrical measuring instrument comprising a tubular metal casing, a magnetic body having a slot, a spring-clamp in said slot, means extending from one side of said casing to engage said clamp and hold one portion of said body in contact with the interior wall of said casing and with the opposite side of said body spaced from the wall of said casing to form an active air gap, a rotatable support in said slot, and a coil mounted on said support and movable in said active air-gap upon the passage of electrical energy through said coil.

4. An electrical measuring instrument comprising a tubular metallic casing, a magnetic body having a portion of its surface fitting one portion of the interior surface of said casing, another portion of the surface of said body concentric to and spaced from another portion of the interior surface of said casing to provide an active air-gap, said body having a slot, a movable standard mounted in said slot, a spring-clamp in said slot for supporting said body in spaced relation to one portion of said casing to provide said air-gap, and a coil attached to said standard and encircling a portion of said magnetic body adjacent to said air-gap to cause movement of said coil and standard upon the passage of electrical energy through said coil.

5. An electrical measuring instrument comprising a tubular metallic casing, a magnetic body having a portion of its surface integral with one portion of the interior surface of said casing, another portion of the surface of said body concentric to and spaced from another portion of the interior surface of said casing to provide an active air-gap, said body having a cavity, a bifurcated spring clamp contacting the wall of said cavity, means for exerting a force to tensionally secure one portion of said body in contact with said casing and the other portion of said body in said cavity spaced relation to said casing, a movable support mounted in said cavity, and a coil having a portion thereof in said air-gap and attached to said support and encircling a portion of said magnetic body to cause movement of said coil and support upon the passage of electrical energy through said coil.

6. An electrical measuring instrument comprising a cylindrical casing, a magnetic body having an arcuate portion of its surface concentric to and intimately engaging one portion of the interior arcuate surface of said cylindrical casing, another portion of the surface of said body eccentric to and spaced from another portion of the interior surface of said casing to provide an active air-gap, said body having a cavity, a movable support mounted in said cavity, and a coil attached to said support and encircling a portion of said magnetic body adjacent said active air-gap to cause movement of said coil and support upon the passage of electrical energy through said coil.

7. An electrical measuring instrument comprising a metallic casing of metallic material, a permanent magnet having pole pieces with a surface of each pole piece in intimate contact with the inner wall of said casing to form a return ring for the magnetic flux from said permanent magnet and having another magnet-portion in spaced relation to an inner wall-portion of said casing, said magnet-portion and said wall-portion being disposed in gradient spaced relation to form an active air-gap of varying flux between said magnet and said casing, a slot in said magnet, friction means engaging said slot for supporting said magnet, and means for supporting a coil in said casing for movement in the active-air-gap.

8. An electrical measuring instrument comprising a metallic casing, a frame disposed in said casing supporting an upper and lower bridge, a permanent magnet supported between the upper and lower bridges and provided with a pole surface spaced from said casing to form an active air-gap therebetween, a clamp secured to said magnet for fastening said frame in said casing, a pillar passing through an opening in said magnet parallel to the pole surface thereof adjacent the active air-gap and journaled for rotation to the upper and lower bridges of said frame, and a coil carried by said pillar and encircling said magnet to cause movement of said coil through the air-gap and rotation of said pillar about its axis upon the passage of electrical energy through said coil.

JULIAN H. BIGELOW.
JACK M. HARRIS.
M. NORMAN SCHWEIZER.

REFERENCES CITED

The following references are of record in the file of this patent:

UNITED STATES PATENTS

| Number | Name | Date |
| --- | --- | --- |
| 1,378,983 | Smith | May 24, 1921 |
| 1,927,346 | Lawrence | Sept. 19, 1933 |
| 1,985,082 | Faus | Dec. 18, 1934 |
| 2,272,767 | Corson et al. | Feb. 10, 1942 |
| 1,918,023 | Faus | July 16, 1933 |

FOREIGN PATENTS

| Number | Country | Date |
| --- | --- | --- |
| 664,795 | Germany | Sept. 9, 1938 |